United States Patent [19]
Garrett et al.

[11] Patent Number: 5,569,550
[45] Date of Patent: Oct. 29, 1996

[54] BATTERY PACK HAVING UNDER-VOLTAGE AND OVER-VOLTAGE PROTECTION

[75] Inventors: Scott M. Garrett; Dipti V. Vashi, both of Lawrenceville, Ga.

[73] Assignee: Motorola, Inc., Schaumburg, Ill.

[21] Appl. No.: 383,127

[22] Filed: Feb. 3, 1995

[51] Int. Cl.$^6$ .................................................. H01M 10/46
[52] U.S. Cl. .................................................. 429/7; 429/61
[58] Field of Search .......................... 429/7, 61; 320/40, 320/55

[56] References Cited

U.S. PATENT DOCUMENTS

| | | | |
|---|---|---|---|
| 4,965,505 | 10/1990 | McCaleb et al. | 429/7 X |
| 5,100,821 | 3/1992 | Fay | 429/7 X |
| 5,142,215 | 8/1992 | Mathison | 320/40 |
| 5,179,337 | 1/1993 | Staarman et al. | 320/40 X |
| 5,304,915 | 4/1994 | Sanpei et al. | 320/40 X |
| 5,411,816 | 5/1995 | Patino | 429/7 |
| 5,462,814 | 10/1995 | Fernandez et al. | 429/7 |

*Primary Examiner*—Stephen Kalafut
*Attorney, Agent, or Firm*—Scott M. Garrett; Kenneth M. Massaroni

[57] ABSTRACT

A battery pack (10) is connected to a load or charger (12) and includes battery cells (20), under-voltage switch (22), a first voltage controlled switch (24), over-voltage switch (28), and second voltage controlled switch (30). Under-voltage switch (22) can block only discharge current, any recharge current may pass through it regardless of its switch state. Over-voltage switch (28) can block only recharge current when switched off and will always allow discharge current to flow regardless of its switch state. First voltage controlled switch (24) maintains under-voltage switch (22) on while battery voltage V1 is above a predetermined under-voltage level. When V1 drops to, or below, the under-voltage level first voltage controlled switch (24) switches off under-voltage switch (22) with a switch signal on line (26). Second voltage controlled switch (30) maintains over-voltage switch (28) on while battery voltage V1 is below a predetermined over-voltage level. When V1 reaches or exceeds the over-voltage level second voltage controlled switch turns off over-voltage switch (28) via a switch signal on line (34).

16 Claims, 3 Drawing Sheets

5,569,550

BATTERY PACK HAVING UNDER-VOLTAGE AND OVER-VOLTAGE PROTECTION

TECHNICAL FIELD

This invention relates in general to batteries and in particular to battery packs having disconnect switches.

BACKGROUND

As electronics have become increasingly portable and sophisticated, consumers have come to expect quality power sources for these products. Typically the best solution is to use a rechargeable battery or battery pack. Such battery packs must be very robust in order to provide as many charge/discharge cycles as possible. In addition, since battery packs are energy storage devices, they must be safe. This is especially true of some of the newer varieties of batteries that have recently become available, for example, lithium ion batteries which have a significantly higher energy density compared to established battery systems such as nickel-cadmium. In order to achieve both safety and reliability, it is necessary for designers of such battery packs to assume a certain level of mistreatment, either intentionally or otherwise, once in the hands of the end user.

One event that decreases reliability, and has occurred with increasing frequency is accidental deep discharge of the battery pack. This occurs when a device is left on for an extended period of time, such as when the user forgets about it, and the battery is discharged far beyond its normal discharge level. For newer systems such as nickel metal hydride, lithium ion, and lithium polymer, this could cause a battery failure. At best, the cycle life of the battery is significantly shortened; at an extreme, it can create a safety risk when recharged.

Another potential problem unique to newer battery systems, particularly lithium ion and lithium polymer, is overcharge. It is well known that lithium metal is highly reactive. In lithium ion cells, there is initially no lithium metal available in the cell. So long as the battery voltage does not exceed a threshold voltage, none will form. If the battery is charged at a voltage above this threshold level, then the battery cells experience what is referred to as an over-voltage condition. This over-voltage condition causes lithium metal to precipitate out of solution in a reaction similar to an electrochemical plating process. Over time, a safety risk could develop as more lithium metal builds up. Lithium polymer cells likewise experience a similar phenomena upon overcharge.

In a typical system, the charger is designed to avoid over-voltage conditions. A variety of failure modes can, however, cause a charger to continue charging once the threshold voltage is reached. This type of failure is commonly referred to as a runaway charger. In order to protect against such a failure, some sort of battery disconnect switch is needed to keep the battery cells from experiencing any over-voltage charging. Ideally such a switch, once activated should still allow the battery pack to be subsequently discharged.

Battery disconnect switches have been advantageously employed in the past to address both under-voltage and over-voltage conditions. However, their cost and complexity often offset any advantage a newer battery system may offer, which is typically already more expensive than conventional systems. For example, there are battery pack resident low voltage, or more commonly, under-voltage, switch circuits in use for lithium ion batteries. However, these circuits, once activated, require a specific signal from a charger to "wake up" the battery switch circuit and allow use of the battery. This requires a certain level of complexity on the part of the charger. Similarly, battery pack resident over-voltage disconnect circuits have been used in a number of lithium ion battery packs. However, they typically use multiple comparators, precision voltage references, and in many cases, custom made integrated circuits.

Accordingly, there is a need for a simple means by which a battery can be disconnected from a load when the battery has been normally discharged, i.e., prior to any deep discharge, and still be rechargeable. Likewise, there is a need for a simple means to disconnect a battery before an over-charge condition occurs so as to avoid any safety risk. Ideally, such requirements can be met by a single means.

DETAILED DESCRIPTION OF THE PREFERRED EMBODIMENT

Figure 1:
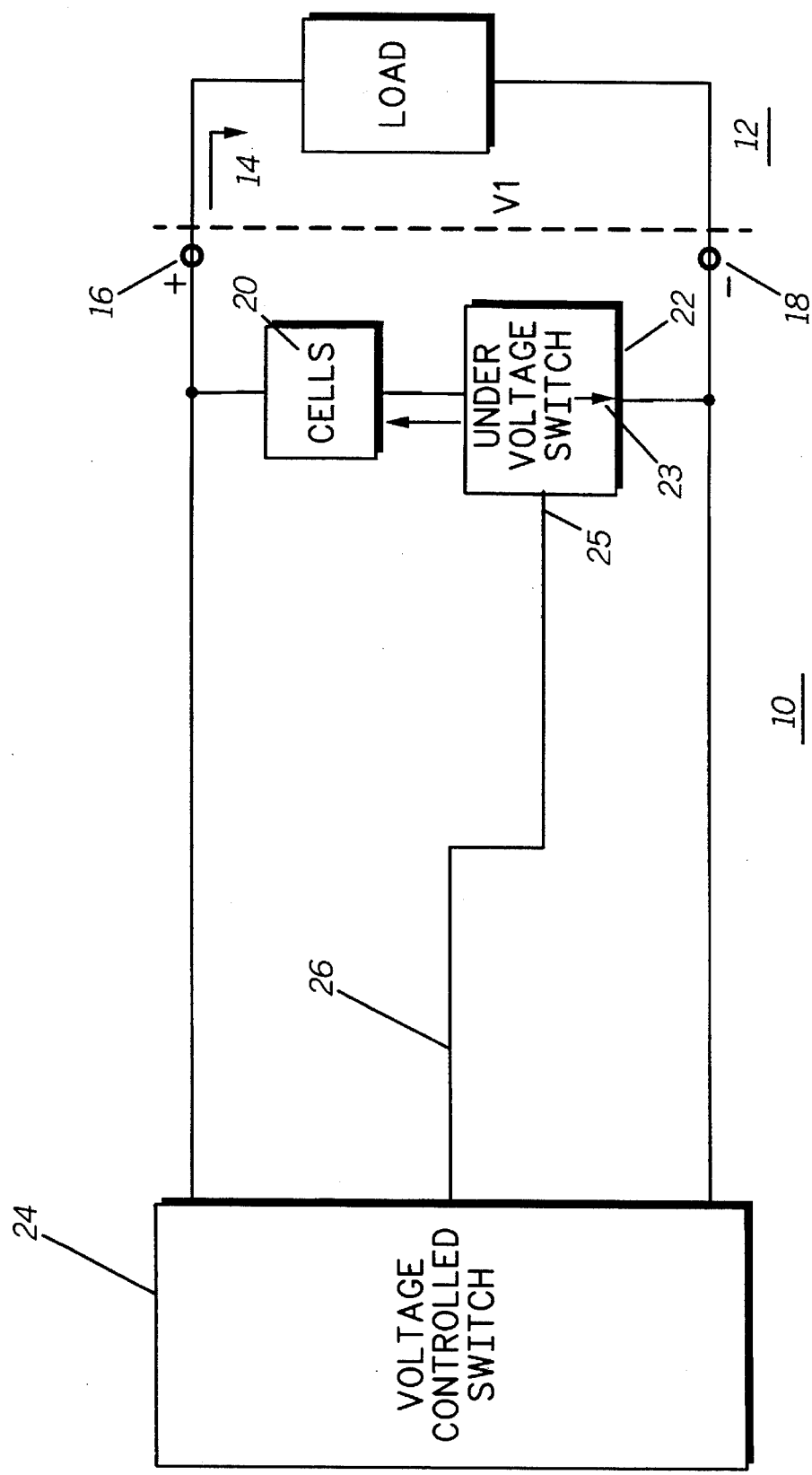
FIG. 1 is a block diagram of a battery system with under-voltage protection means in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, where there is illustrated therein a block diagram of a battery system in accordance with the instant invention. There is shown battery pack 10 and load 12, such as a cellular phone, portable two way radio, portable computer, or any such device requiring a portable power source. Load 12 draws a discharge current from battery pack 10 in the direction of arrow 14. A battery voltage V1 is applied between positive battery terminal 16 and negative battery terminal 18.

Battery pack 10 is comprised of at least one battery cell 20, under-voltage switch 22, and voltage controlled switch 24. Under-voltage switch 22 has a one way action in that current in the direction of arrow 23 can always flow, regardless of whether under-voltage switch 22 is actuated or not. Current flowing in the opposite sense of arrow 23 will be blocked if under-voltage switch 22 is actuated, but will flow otherwise.

The switch state, i.e., on or off, of under-voltage switch 22 is controlled by control input 25. Specifically, under-voltage switch 22 is responsive to a switch signal generated by voltage controlled switch 24 and carried on line 26 to control input 25. Voltage controlled switch 24 is responsive to battery voltage V1 and provides a switch signal on line 26 so as to maintain under-voltage switch 22 in the on state, that is, conductive in both directions, until such time as battery voltage V1 falls below a predetermined under-voltage level. When the battery voltage V1 falls below the under-voltage level, voltage controlled switch 24 turns off and causes under-voltage switch 22 to block further discharge, thereby limiting the depth of discharge that battery cells 20 experience. When under-voltage switch 22 turns off, battery voltage V1 drops to about zero volts, which causes voltage controlled switch 24 to stay in the off state, even when the voltage across battery cells 20 rises above the under-voltage level. Since under-voltage switch 22 is a one way blocking switch the battery can be charged by simply applying recharge current. This reverses the voltage across under-voltage switch 22, raises battery voltage V1 above the under-voltage level, and turns on voltage controlled switch 24.

Figure 2:
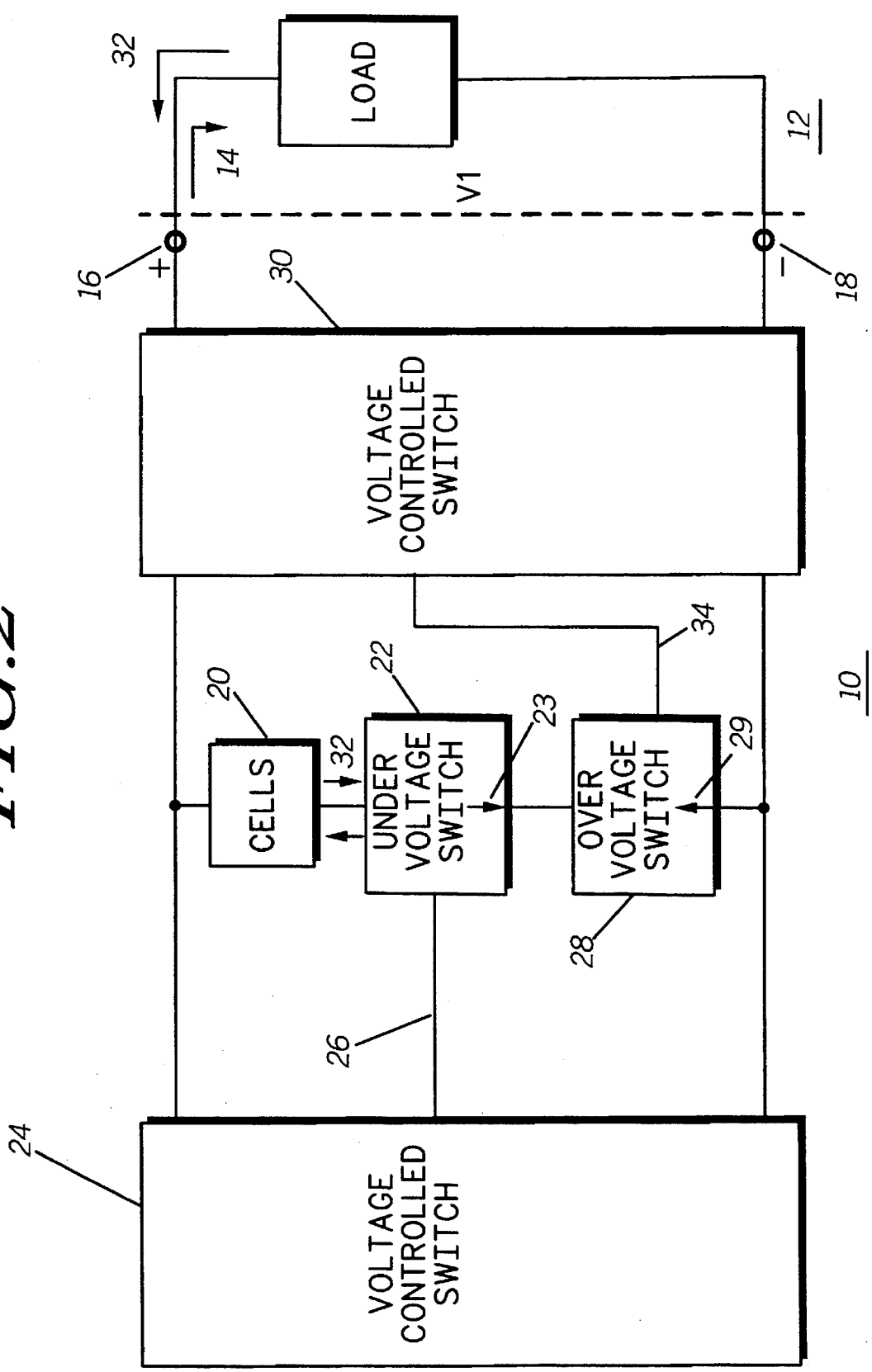
FIG. 2 is a block diagram of a battery system as in FIG. 1 and incorporating over-voltage protection means in accordance with the invention.

Referring now to FIG. 2, where there is illustrated therein a block diagram of a battery pack 10 as in FIG. 1, and further including over-voltage switch 28 and second voltage controlled switch 30. However, in this case, load 12 may discharge battery pack 10, as before, or supply a recharge current in the direction of arrow 32. Over-voltage switch 28, when activated, will block recharge current, but will allow discharge current to pass in the direction of arrow 29. In this sense, over-voltage switch 28 acts as a one way blocking switch, like under-voltage switch 22. When recharge current flows into the battery, the battery voltage rises. Once battery voltage V1 reaches a second predetermined level, second voltage controlled switch 30 turns on and provides a switch signal on line 34, causing over-voltage switch 28 to block any further charging. Typically, voltage across battery cells 20 would drop slightly, causing battery voltage V1 to drop accordingly.

However, since battery chargers typically regulate current, when over-voltage switch 28 opens, the charger voltage climbs to its maximum level in an attempt to maintain current regulation. While the charger output is connected parallel to battery pack 10, the charger output voltage becomes the battery voltage V1, and voltage controlled switch 30 maintains the switch signal on line 34, and over-voltage switch 28 continues to block recharge current. The cells can still be discharged since under-voltage switch 22 will not be engaged, and over-voltage switch 28 only blocks recharge current.

Figure 3:
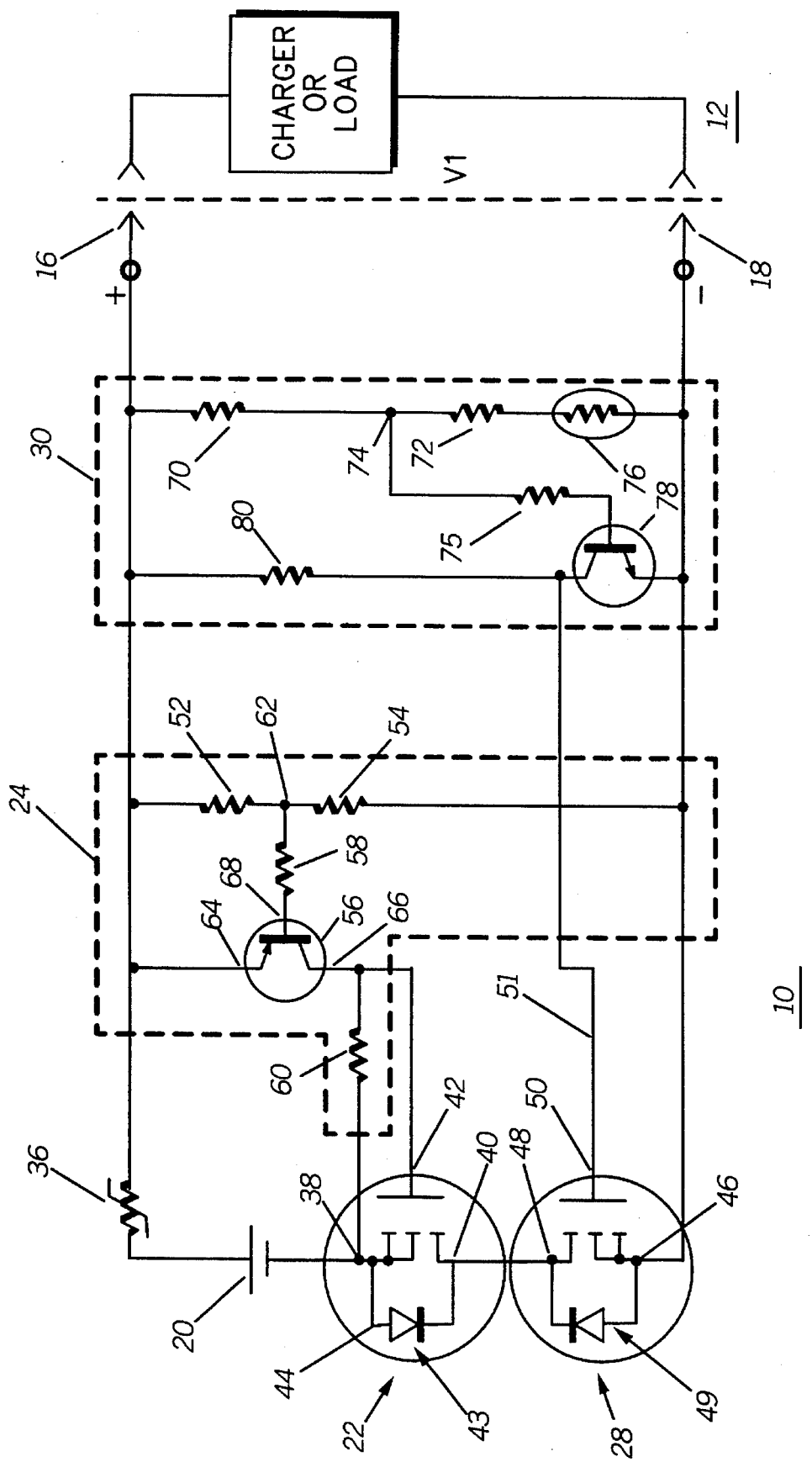
FIG. 3 is a schematic diagram of a circuit in accordance with the invention.

Referring now to FIG. 3, where there is illustrated therein a schematic circuit diagram of a circuit in accordance with the invention. There is shown a battery pack 10 connected to a charger or load 12 through positive battery terminal 16 and negative battery terminal 18, across which battery voltage V1 is evident. Also included is at least one battery cell 20, under-voltage switch 22, first voltage controlled switch 24, over-voltage switch 28, second voltage controlled switch 30, and polyswitch 36. Polyswitch 36 is a current interrupt device which responds to high current being passed through it. If an excessive level of current is applied, either in the charge or discharge direction, polyswitch 36 will change from a very low electrical resistance to a very high electrical resistance, providing a switch action. The use of a polyswitch in this manner is well known in the art Under-voltage switch 22 and over-voltage switch 28 achieve a one way blocking operation by coupling a diode in parallel with a switch. In one preferred embodiment, N-channel MOSFETs are used since these devices provide excellent switch actions and have an intrinsic diode as a result of the manufacturing process used to fabricate them. Under-voltage switch 22 has a source terminal 38, drain terminal 40, and gate terminal 42. The intrinsic diode 43 is connected parallel to the MOSFET with anode 44 connected to source terminal 38. This orientation allows recharge current to pass through battery cell 20 regardless of the switch state of under voltage switch 22. Source terminal 38 is also connected to battery cell 20, while gate terminal 42 is a control input.

Over-voltage switch 28 also has a source terminal 46, drain terminal 48, and gate terminal 50. Drain terminal 48 is connected to drain terminal 40 of under-voltage switch 22, source terminal 46 is connected to negative battery terminal 18, and is coupled in parallel with intrinsic diode 49 similar to under-voltage switch 22, but oriented in a reverse sense so as to block recharge current through battery pack 10. Gate terminal 50 acts as a control input and receives a switch signal from line 51.

First voltage controlled switch 24 comprises first divider resistor 52, second divider resistor 54, bipolar transistor 56, coupling resistor 58, and bias resistor 60. First and second divider resistors 52 and 54 are connected in series between the positive and negative battery terminals 16 and 18 respectively, and form midpoint node 62. The voltage at midpoint node 62 is proportional to battery voltage V1 and dependent on the values of divider resistors 52 and 54. Bipolar transistor 56 acts as a voltage controlled switch element and has emitter, collector and base terminals 64, 66, and 68, respectively. Bipolar transistor 56 conducts current from emitter terminal 64 to collector terminal 66 when a bias voltage is applied across the emitter-base junction.

Base terminal 68 is coupled to midpoint node 62 by coupling resistor 58. Coupling resistor 58 acts to limit current through the emitter-base junction of bipolar transistor 56. Divider resistors 52 and 54 are selected such that while battery voltage V1 is above the first predetermined level, a low voltage cutoff level, the voltage at midpoint node 62 is equal to or greater than the minimum bias voltage of bipolar transistor 56. As a result, bipolar transistor 56 conducts a current to bias resistor 60, thereby producing a bias voltage. This bias voltage maintains under-voltage switch 22 in an on state. If battery voltage V1 drops below the under-voltage level, the voltage at midpoint node will not be sufficient to bias bipolar transistor 56, and bipolar transistor will not conduct current to bias resistor 60. This results in under-voltage switch 22 shutting off. When battery voltage V1 falls below the under-voltage level, current can not be drawn from battery pack 10 and battery voltage V1 drops to about zero volts.

Second voltage controlled switch 30 operates in a similar fashion. It is comprised of divider resistors 70 and 72, which are connected in series and form midpoint node 74. In one preferred embodiment, thermistor 76 is included, and is a negative temperature coefficient type. If thermistor 76 is not required, then divider resistor 72 would be connected directly to negative battery terminal 18. Bipolar transistor 78 acts as a switch element, and is connected to midpoint node 74 through coupling resistor 75. The voltage on line 51 is pulled up to a high level through bias resistor 80. This voltage level is applied to over-voltage switch 28 at control input 50 such that over-voltage switch 28 is switched on. Third and fourth divider resistors 70 and 72, and thermistor 76, if included, are selected such that when battery voltage V1 is above the over-voltage level, a second predetermined level, bipolar transistor is biased on and the voltage on line 51 drops to about 0 volts. This switch signal causes over-voltage switch 28 to switch off and block further recharge.

The purpose of thermistor 76 is to compensate the thermal bias voltage error of bipolar transistor 78 in a manner known in the art. It is well known that bipolar transistors have a thermal bias voltage error of about −2 milliVolts/°C. That is, as the temperature of the transistor increases, less voltage is required to bias it to an on state, and more voltage is required as the temperature decreases. Since the over-voltage level is chosen for safety reasons, it is imperative that the over-voltage switch acts at the same battery voltage level independent of temperature. Although shown here connected in series with divider resistors 70 and 72, it could just as easily be connected in parallel to divider resistor 72, or in a resistive network connected between midpoint node 74 and negative battery terminal 18. All of which are choices dependent on the specific design and the elements available.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery pack having a battery voltage, comprising:

at least one battery cell having a positive battery terminal and a negative battery terminal;

one way blocking switch means responsive to a switch signal, and having a switch state having at least an on and off state, said blocking switch means being coupled in series with said at least one battery cell such that a discharge current applied to said battery pack will flow through said one way blocking switch means regardless of said switch state and blocking a recharge current when in said off state; and voltage controlled switch means responsive to said battery voltage for producing said switch signal.

2. A battery pack as in claim 1, wherein said voltage controlled switch means maintains said one way blocking switch in the on state when said battery voltage is greater than an under-voltage level.

3. A battery pack as defined in claim 1, wherein said at least one battery cell is selected from the group consisting of nickel cadmium cells, nickel metal hydride cells, lithium ion cells, lithium polymer cells, and combinations thereof.

4. A battery pack as defined in claim 1, wherein said one way blocking switch means comprises:

a transistor switch; and a diode, having an anode connected in parallel with said transistor switch means such that said anode is connected to said at least one battery cell.

5. A battery pack as defined in claim 1 wherein said one way blocking switch means is a MOSFET including a diode.

6. A battery pack as defined in claim 1 wherein said voltage controlled switch means comprises:

a bipolar transistor having emitter, collector, and base terminals, said emitter terminal connected to said positive terminal of said battery pack, said collector terminal connected to said one way blocking switch means;

first and second divider resistors coupled in series between said positive battery terminal and said negative battery terminal, said divider resistors forming a midpoint node; and a first coupling resistor connected between said base terminal of said bipolar transistor and said midpoint node of said first and second divider resistors.

7. A battery pack as defined in claim 1, further comprising:

a second one way blocking switch means responsive to a second switch signal and having a switch state having at least an on and an off state, said second one way blocking switch means coupled in series with said at least one battery cell such that a recharge current from said battery pack will flow through said second one way blocking switch means regardless of said switch state of said second one way blocking switch means; and a second voltage controlled switch means responsive to said battery voltage for producing said second switch signal.

8. A battery pack as in claim 7, wherein said second voltage controlled switch means maintains said second blocking switch in the on state when said battery voltage is below an over-voltage level.

9. A battery pack as defined in claim 7, wherein said second one way blocking switch means comprises:

a transistor switch; and a diode having an anode, said diode connected in parallel with said transistor switch and oriented such that said anode is connected to said negative battery terminal.

10. A battery pack as defined in claim 7, wherein said second one way blocking switch means is a MOSFET including an intrinsic diode.

11. A battery pack as defined in claim 7, wherein said second voltage controlled switch means comprises:

a second bipolar transistor having emitter, collector, and base terminals, said emitter terminal connected to said negative terminal of said battery pack, said collector terminal connected to said control input of said second one way blocking switch means;

third and fourth divider resistors coupled in series between said positive and negative battery terminals, said divider resistors forming a midpoint node;

a second coupling resistor connected between said base terminal of said second bipolar transistor and said midpoint node of said third and fourth divider resistors; and a second bias resistor connected between said control input of said second one way blocking switch means and said positive battery terminal.

12. A battery pack having a battery voltage, comprising:

at least one battery cell having a positive battery terminal and a negative battery terminal;

under-voltage protection circuit including a first one-way blocking switch responsive to a first switch signal and having a switch state having at least an on state and an off state, said first one-way blocking switch coupled in series with said at least one battery cell and blocking a discharge current through said at least one battery cell when in said off state and always allowing a recharge current through said at least one battery cell regardless of said switch state, and a voltage controlled switch responsive to said battery voltage for providing said first switch signal; and over-voltage protection circuit comprising a second one-way blocking switch responsive to a second switch signal and having at least an on and an off state, said second blocking switch coupled in series with said at least one battery cell and blocking a recharge current through said at least one battery cell when in said off state and always allowing a discharge current through said at least one battery cell, and a second voltage controlled switch means responsive to said battery voltage for producing said second switch signal.

13. A battery pack as in claim 12, wherein first voltage controlled switch maintains said first one-way blocking switch in the on state when said battery voltage is greater than an under-voltage level.

14. A battery pack as in claim 12 wherein second voltage controlled switch maintains said second one-way blocking switch in the on state when said battery voltage is below an over-voltage level.

15. A battery pack as in claim 12, wherein said first and second one-way blocking switches each comprise a first transistor switch and a diode having an anode and a cathode, said diode connected in parallel with said transistor switch, such that said anode is connected to said at least one battery cell.

16. A battery pack as in claim 12, wherein said first and second voltage control switches each comprises a bipolar transistor, a pair of divider resistors coupled in series between said positive and negative battery terminals and a coupling resistor connected between said bipolar transistor and said divider resistors.

* * * * *